3,303,882
PROCESS FOR SEALING POROUS EARTH FORMATIONS

William C. Browning, Alphonse C. Perricone, and Billy G. Chesser, Houston, Tex., assignors to Milchem Incorporated, Houston, Tex., a corporation of Delaware
No Drawing. Filed Mar. 12, 1964, Ser. No. 351,568
6 Claims. (Cl. 166—38)

This invention relates generally to the art of drilling wells and more particularly to a composition and method for sealing porous earth formations employed in the drilling of wells.

In the drilling of oil and gas wells, earth formations are frequently encountered which are of a highly porous, permeable, or fissured character, commonly termed "thief" zones, into which the drilling fluid being circulated through the well bore will escape, disrupting the drilling operation and frequently creating hazardous and uneconomic conditions in the drilling operations.

Many solutions have been employed or proposed for solving the problem, commonly termed, "lost circulation." These include empolyment of special cements which are forced into the thief zones and allowed to harden in order to fill the pores, fractures, or other openings responsible for the loss of fluid; various types of chemical compositions, such as those of a polymerizable character, which may be caused to polymerize, in situ, in order to plug the pores and interstices in the formations; compositions containing granular or fibrous materials which are used particularly where the openings in the formations are quite large; various combinations of these compositions; bacteriological processes; and many other procedures and compositions all designed to seal off or plug the thief zones.

All of the procedures and compositions heretofore employed suffer various disadvantages arising from the character of the materials employed, the procedures by which they are applied, and conditions encountered in the wells. Some involve relatively long time periods for activation or completion of the chemical or physical reactions involved, which necessarily cause expensive interruptions in the drilling operation. Others produce plugging compositions which are relatively unstable and may be washed from the pores of the thief zones by the fluid pressures encountered. Others form filter cakes or surface deposits which may be washed or scraped from the formation faces by the circulating drilling fluid or the drilling tools. Still other procedures require the use of excessive pressures for properly displacing the lost circulation control materials to the desired sites.

The present invention has for its primary object the provision of a composition and method of applying the same which obviate various disadvantages of the prior compositions and procedures, such as previously noted.

The present invention contemplates the use of a unique clay material and a chemical activator which, when mixed in the well bore in a lost circulation zone, react to form, in the openings of the thief zones, a high-strength gel of semi-hard or stiff plastic consistency which quickly and effectively plugs and seals off the openings and passages of the thief zones with a minimum loss of time and without the requirement for high-pressure or otherwise specialized pumping equipment.

The procedure, in accordance with this invention, involves the introduction of an aqueous solution of the activator chemical into the lost circulation zone, followed immediately by an aqueous slurry of the clay mineral. The successive placement of the two materials is readily effected by displacement in the conventional manner by the regular rotary rig mud pumps and the reaction occurs almost instantaneously upon admixture of the two materials, in situ, to seal off the thief zone.

The clay mineral employed in accordance with this invention, is a natural clay which is found to have a combination of unique properties in that it is capable of forming a readily pumpable slurry, even in concentrations of 200 lbs. or more, per barrel of water, and which, when admixed with an alkaline activator will quickly form an unusually high strength, semi-hard gel having very high water-imbibing properties.

The clay mineral, in accordance with this invention may be further generally characterized as an acid three-layer clay mineral of the expanding lattice type which possesses, and may be further characterized by, the unique combination of properties mentioned above, namely, the ability to form pumpable slurries at relative high concentrations and to rapidly form very high strength gels upon activation with an alkaline material. Also, acid clays of this type generally develop pH values in the range from about 3.5 to about 4.5 when slurried in fresh water.

Clay minerals having the unique properties mentioned, have been found in natural deposits, and particularly in deposits located in Munroe and Itawamba Counties, Mississippi.

The activator material is an aqueous solution of an alkaline material which is capable of providing sodium ions and hydroxyl ions for reaction with the clay mineral. The preferred examples of such alkaline materials are sodium hydroxide and sodium silicate and mixtures thereof.

The mechanism of the reactions occurring between this unique clay mineral and the alkaline material is not fully understood but appears to involve a form of base exchange reaction, whereby the inner layer cations of the clay, such as calcium or hydrogen, are replaced by the alkali cation from the particular alkaline material used. The presence of hydroxyl ions significantly affects the extent of flocculation of the clay. The physical reactions appear to be an initial quick flocculation of the clay slurry followed by a further rapid gelling action as the alkalinity of the slurry increases. In general, the activation occurs when the clay slurry attains the neutral or slightly alkaline state and intensifies as the pH values exceed about 9.5.

Presently, identification of the particular kind of clay mineral which is effective in accordance with this invention, can only be made by generally empirical tests, namely, the exceptional gelling action when the clay mineral in an aqueous slurry is admixed with an aqueous alkaline solution, together with the ability to form readily pumpable slurries in water under high loading conditions. The results of these empirical tests are so quickly obvious that they serve to readily identify a clay mineral suitable for purposes of this invention and to differentiate it from all other clays.

It appears that the clay mineral must, in any event, fall within the general characterization mentioned, namely, an acid clay mineral of the three-layer, expanding lattice type, since it appears that other clays, such as the Illites, for example, are ineffective for the purposes of this invention. While there are numerous clays, which meet the general characterization mentioned, they do not possess the unique combination of properties described and they may be distinguished readily from the desired clay minerals by the empirical tests mentioned above. For example, certain bentonites will fall within the general characterization mentioned, but imbibe water so rapidly that even very small amounts in water or alkali solutions form non-pumpable gels and the addition of alkali will deflocculate the gels. On the other hand, other clays may be slurried in water to a substantial extent and form pumpable slurries, however, addition of alkali thereto will not cause gelling of the slurry, but will deflocculate the same.

It is found that various materials may be added to the clay slurry which appear to facilitate the base exchange by forming insoluble precipitates with the soluble calicum ions which will be released by the exchange reaction with the sodium ions supplied from the activator materials. Such precipitants include the alkali and ammonium carbonates and phosphates and when required, will be added in small quantities to the clay slurry. It will be evident that care must be exercised in the addition of such materials, in order not to render the slurry alkaline before its admixture with the alkaline activator. With similar caution, small amounts of sodium acid pyrophosphate may be added to the slurry to act as a deflocculating agent to render the slurry more pumpable and also to counteract the inhibiting effect on the gelling action by sodium chloride in brines frequently present in the connate fluids contained in the earth formations traversed by well bores.

In some cases it may also be found desirable to incorporate in the final gel the various well known granular or fibrous materials employed in more conventional lost circulation control procedures. Such materials, when employed, will be incorporated in the clay slurry before its introduction into the well.

The clay slurry may be prepared by thoroughly admixing the desired quantity of the clay mineral in finely powdered form in fresh water. Preferred admixtures will range from about 125 to about 200 pounds of the clay per barrel (42 gallons) of water. It appears on the basis of present experience, that the greater the quantity of clay which can be incorporated in the slurry while still producing a pumpable slurry, the stronger and otherwise more effective the gel which will be produced in situ. The particle size of the clay may be varied. Generally, it appears that the smaller the particle size, the better will be the resulting gel. In some cases, however, a mixture of different particle sizes may be found desirable, particularly for filling relatively large voids in the thief zones.

Where required, one or more of the other additives mentioned previously, may be incorporated in the clay slurry preparatory to introducing it into the well bore.

The activator material is then dissolved in water in amounts as required to form an aqueous solution of the desired concentration. In one example, an admixture of 18% sodium hydroxide and 82% sodium silicate will be admixed with water to form a solution containing approximately 40% by weight of these materials. Other admixtures of these chemicals, or solutions of either one alone may be employed and the concentrations in aqueous solutions may vary widely within a range from about 10% to about 50% by weight of the solution. The volume of activator solution employed will generally range from about 10% to about 30% by volume of the clay slurry, depending, in part, upon the concentration of the activator solution, the clay load in the slurry, and conditions in the well bore and thief zone.

The materials are introduced into the thief zone or zones by generally conventional hydraulic displacement procedures. The requisite volume of activator solution will first be introduced into the drill string or other pipe string and followed by the pre-determined volume of clay slurry, the successive volumes being displaced by a suitable hydraulic fluid which may be drilling mud, water or the like. The respective volumes will be calculated to assure entrance of the activator solution into the thief zone followed immediately by the slurry. Due to the permeable nature of the thief zone, the activator material flows into the openings and interstices thereof and the following slurry will likewise enter the openings and interstices where admixing with the activator will occur, quickly producing the strong semi-hard gel which will completely fill and close off the openings. This action will be signalled at the surface by a quick increase in pump pressure followed by fluid returns to the surface, thereby showing that the thief zones have been sealed and normal circulation restored.

By reason of the strength of the resulting gel and its high water-imbibing properties, the gel will be strongly held in the openings in the thief zones, even when these are quite large, and will not be washed out by formation fluids, so that once a zone has been sealed, it will remain sealed throughout the subsequent drilling and other operations which may be conducted in the well.

The dramatic results obtained with the composition and procedure in accordance with this invention is evidenced by a field test conducted in a well located in Utah. The daily operation of this well indicated an extremely troublesome section, with at least six lost circulation zones being encountered from the surface to a depth of 4700 feet. Sealing these zones with conventional lost circulation materials, and even with repeated high pressure squeeze procedures, proved ineffective, resulting in extensive interruption in drilling and great expense. The composition and procedure in accordance with this invention were then employed and effectively stopped loss of circulation with practically no loss of drilling time, the two materials being introduced as described in the circulating drilling mud stream and upon attaining the thief zones, sealed them off without further interruption of the drilling.

In most instances, combined volumes of the activator material and the clay slurry totalling from about 20 to about 30 barrels will be found sufficient to seal-off a thief zone. In extreme cases of lost circulation it may prove advantageous to repeat the described operations in several successive stages by introducing alternate volumes of activator solution and clay slurry into the drill pipe. Preferably, the stages should be spaced at time intervals of about 30 to 45 minutes for displacement of the successive volumes of activator and slurry.

From the foregoing, it will be evident that the compositions and process in accordance with this invention provides a unique lost circulation control method and composition, some of the advantages of which may be briefly summarized, as follows:

(1) Since no appreciable waiting time is required for the admixture of the components to set, very little expensive rig time will be lost before drilling may be resumed. If additional treatments of the well are required they can be run without delay.

(2) As the activator material is a separate component, there is no critical set time, since the reaction takes place immediately upon admixing. Moreover the slurry can be held in the drill pipe for extended periods of time without fear of the material setting.

(3) The product composition is highly resistant to erosion by water and thus will not be washed out of the thief zone.

(4) The product composition becomes harder with time and is not subject to bacterial or thermal degradations.

(5) The product composition stops loss of circulation by penetrating and setting within the loss zone itself, and does not depend upon a surface or near surface bridging effect which is subject to removal by subsequent action of the drill pipe and drill bit through the thief zone.

While especially useful for controlling lost circulation in drilling wells, the composition in accordance with this invention, may be employed in water flood type of secondary oil recovery operations, as for selectively sealing-off the more permeable portions of the producing formations to prevent channelling and excessive loss of the flooding fluids. In such operations the procedures previously outlined may be employed in conjunction with suitable placement of packers in the known manner for isolating the zones to be sealed.

Other useful applications of the invention are in soil stabilization for foundation purposes and the like.

It will be understood that numerous modifications and alterations may be made in the illustrative embodiments of the invention herein described within the scope of the appended claims but without departing from the spirit of this invention.

What is claimed and desired to be secured by Letters Patent is:

1. The method of sealing porous earth formations, comprising, successively introducing into a porous earth formation, first, an aqueous solution of an alkaline material selected from the class consisting of sodium hydroxide, sodium silicate and mixtures thereof; second, an aqueous slurry of a clay mineral of the acid three-layer, expanding lattice type characterized by the properties of (a) forming a readily pumpable slurry in high concentrations (from about 125 to about 200 pounds per barrel (42 gals.) of fresh water); and (b) of forming, when in aqueous slurry, an exceptionally high-strength, semi-hard gel upon admixture with said alkaline material; and causing intermixing of said solution and slurry, in situ, in said earth formations, the relative proportions of the inter-mixed materials being such as to render said slurry neutral to alkaline.

2. The method according to claim 1 wherein said alkaline material is a mixture of sodium hydroxide and sodium silicate totalling about 40% by weight of said solution.

3. The method according to claim 1 wherein the volume of said aqueous solution is in the range of from about 10% to about 30% of the volume of said slurry.

4. The method according to claim 1 wherein said slurry has incorporated therein a base exchange-facilitating material selected from the class consisting of sodium carbonate, sodium phosphate, sodium acid pyrophosphate, and mixtures thereof in amounts less than sufficient to render said slurry neutral.

5. The method according to claim 1 wherein the situs of said porous earth formations is in a well bore.

6. The method according to claim 1 wherein said slurry before intermixing with said solution has a pH value in the range from about 3.5 to about 4.5.

References Cited by the Examiner

UNITED STATES PATENTS

| | | | |
|---|---|---|---|
| 2,198,120 | 4/1940 | Lerch | 166—29 |
| 2,402,588 | 6/1946 | Andersen | 166—29 X |
| 2,863,509 | 12/1958 | Messenger | 166—29 |
| 2,981,630 | 4/1961 | Rowland | 252—8.5 X |
| 3,028,913 | 4/1962 | Armentrout | 252—8.5 |
| 3,111,006 | 11/1963 | Caron | 166—29 X |
| 3,146,828 | 9/1964 | Mann | 166—29 X |

CHARLES E. O'CONNELL, *Primary Examiner.*

N. C. BYERS, *Assistant Examiner.*